(12) United States Patent
Guo et al.

(10) Patent No.: US 12,545,783 B2
(45) Date of Patent: Feb. 10, 2026

(54) MELT FLOW ADDITIVE FOR POLYCARBONATES AND OTHER ENGINEERING RESINS

(71) Applicant: Rohm and Haas Company, Collegeville, PA (US)

(72) Inventors: Hailan Guo, Warrington, PA (US); Morris C. Wills, Philadelphia, PA (US)

(73) Assignee: ROHM AND HAAS COMPANY, Collegeville, PA (US)

( * ) Notice: Subject to any disclaimer, the term of this patent is extended or adjusted under 35 U.S.C. 154(b) by 616 days.

(21) Appl. No.: 17/919,414

(22) PCT Filed: Apr. 19, 2021

(86) PCT No.: PCT/US2021/027868
§ 371 (c)(1),
(2) Date: Oct. 17, 2022

(87) PCT Pub. No.: WO2021/216392
PCT Pub. Date: Oct. 28, 2021

(65) Prior Publication Data
US 2023/0159747 A1    May 25, 2023

Related U.S. Application Data

(60) Provisional application No. 63/013,080, filed on Apr. 21, 2020.

(51) Int. Cl.
| | | |
|---|---|---|
| C08F 2/38 | (2006.01) | |
| C08F 2/26 | (2006.01) | |
| C08F 20/14 | (2006.01) | |
| C08F 220/18 | (2006.01) | |
| C08F 222/10 | (2006.01) | |
| C08L 9/06 | (2006.01) | |
| C08L 69/00 | (2006.01) | |

(52) U.S. Cl.
CPC ............... *C08L 69/00* (2013.01); *C08F 2/26* (2013.01); *C08F 2/38* (2013.01); *C08F 20/14* (2013.01); *C08F 220/1804* (2020.02); *C08F 222/102* (2020.02); *C08L 9/06* (2013.01); *C08L 2201/10* (2013.01); *C08L 2203/30* (2013.01); *C08L 2205/025* (2013.01); *C08L 2205/03* (2013.01); *C08L 2205/06* (2013.01)

(58) Field of Classification Search
CPC ........ C08L 69/00; C08L 9/06; C08L 2201/10; C08L 2203/30; C08L 2205/025; C08L 2205/03; C08L 2205/06; C08L 33/12; C08L 51/04; C08F 2/26; C08F 2/38; C08F 20/14; C08F 220/1804; C08F 222/102; C08F 283/02
See application file for complete search history.

(56) References Cited

U.S. PATENT DOCUMENTS

| | | | |
|---|---|---|---|
| 4,269,749 A | 5/1981 | Marriott et al. | |
| 4,788,249 A * | 11/1988 | Maresca | ................. C08L 67/02 525/425 |
| 6,252,002 B1 * | 6/2001 | Yamada | .................. C08L 33/12 525/228 |
| 6,646,068 B2 | 11/2003 | Chisholm et al. | |
| 7,244,796 B2 | 7/2007 | Chisholm et al. | |
| 7,498,395 B2 | 3/2009 | Chisholm et al. | |
| 10,040,915 B2 | 8/2018 | Guo et al. | |
| 2014/0323642 A1 * | 10/2014 | Choi | ....................... C08L 69/00 525/185 |

FOREIGN PATENT DOCUMENTS

| | | |
|---|---|---|
| WO | 199804603 | 2/1998 |
| WO | 2020263495 A1 | 12/2020 |
| WO | 2020263496 A1 | 12/2020 |

* cited by examiner

*Primary Examiner* — Kumar R Bhushan
(74) *Attorney, Agent, or Firm* — Warner Norcross + Judd LLP

(57) ABSTRACT

Disclosed is a composition comprising a polycarbonate or engineering resin and a branched polymer which is a reaction product of reactants comprising one or more monoethylenically unsaturated ester monomers, a chain transfer agent in an amount of 0.1 to 10 weight percent, and a crosslinker in an amount of 0.1 to 10 weight percent of a crosslinker, wherein weight percent is based on total amount of reactants, provided the amount of crosslinker in moles is less than the effective amount of chain transfer agent in moles, and articles thereof.

13 Claims, 1 Drawing Sheet

MELT FLOW ADDITIVE FOR POLYCARBONATES AND OTHER ENGINEERING RESINS

FIELD OF THE INVENTION

The field of this invention is compositions comprising polycarbonates or other engineering resins and articles made from such compositions.

BACKGROUND

A variety of indoor and outdoor products benefit from use of transparent and/or weather resistant plastic materials. Fluorine containing polymers and thermoplastic polyurethanes provide those characteristics but are too expensive for many end uses.

Polycarbonate materials tend to be highly viscous which makes processing challenging in certain applications. Conventional additives may negatively impact the light transmission of polycarbonate compositions.

SUMMARY OF THE INVENTION

Disclosed herein is a composition comprising a resin selected from a polycarbonate resin and an engineering resin, wherein the resin does not comprise a multi-stage acrylic resin, and a branched polymer which is a reaction product of reactants comprising one or more monoethylenically unsaturated ester monomers, a chain transfer agent in an amount of 0.1 to 10 weight percent, and a crosslinker in an amount of 0.1 to 10 weight percent of a crosslinker, wherein weight percent is based on total amount of reactants, provided the amount of crosslinker in moles is less than the effective amount of chain transfer agent in moles. The branched polymer is not cross-linked.

Also disclosed herein is an article comprising the above composition.

DETAILED DESCRIPTION OF THE INVENTION

Figure 1:
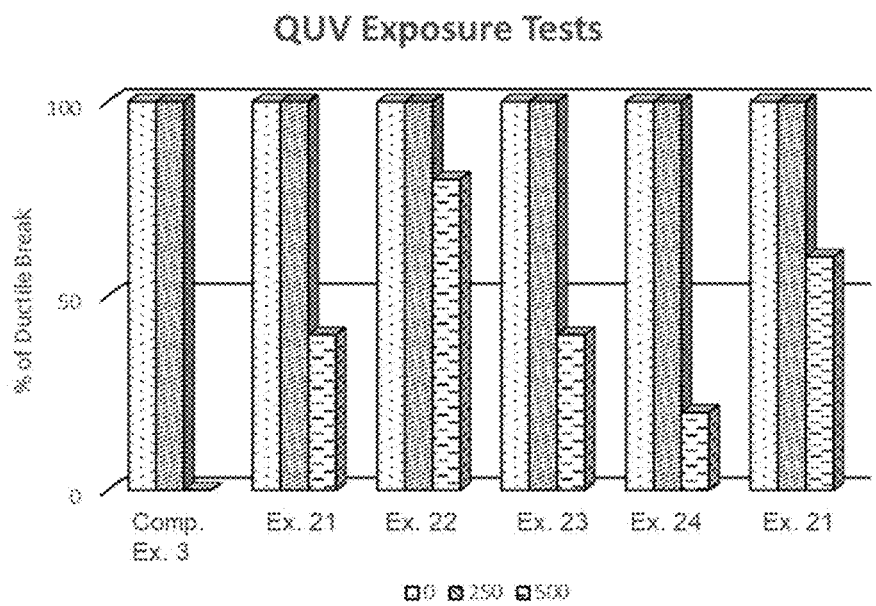
FIG. 1 is a graph showing the results of weatherability testing on compositions according to embodiments of the present invention.

Disclosed herein is a composition comprising a resin, wherein the resin is selected from a polycarbonate resin and an engineering resin, and a branched polymer.

The resin is selected from a polycarbonate resin and an engineering resin. As used herein, the term "polycarbonates" includes both homopolycarbonates, wherein the repeating unit in the polycarbonate is the same, and polycarbonate copolymers, which comprise different repeating units in the polycarbonate. As used herein, the phrase "engineering resin" refers to a resin selected from polycarbonate-polyester blends, poly(methyl methacrylate), polyamides, poly(alkylene terephthalates), and blends thereof. Preferably, the resin is selected from a polycarbonate resin and a poly(methyl methacrylate) resin. More preferably, the resin is a polycarbonate resin.

Preferably, the resin does not comprise a multi-stage acrylic resin. As used herein, the phrase "does not comprise a multi-stage acrylic resin" means the resin component of the composition does not contain a multi-stage acrylic resin, i.e., an acrylic resin comprising multiple different acrylic components. The composition comprises a branched polymer, as described below, and optionally an impact modifier.

The branched polymer is a reaction product of reactants comprising one or more monoethylenically unsaturated ester monomers, a chain transfer agent in an amount of 0.1 to 10 weight percent, and a crosslinker in an amount of 0.1 to 10 weight percent of a crosslinker, wherein weight percent is based on total amount of reactants. The branched polymer is not cross-linked. To avoid cross-linking, the amount of cross-linker is not greater than the amount of chain transfer agent. Thus, according to certain embodiment the moles of cross-linker is no greater than or is less than the moles of chain transfer agent. According to certain embodiments the weight percent of crosslinker is less than the weight percent of chain transfer agent.

Suitable monoethylenically unsaturated ester monomers useful in making the branched polymer according to certain embodiments can have the structure R'—C(O)O—R where R is a hydrocarbyl group (e.g. alkyl group or aryl group). and R' is a monoethylenically unsaturated aliphatic group having at least 2 or 3 carbon atoms. According to certain embodiments R is an alkyl group of at least 1 or 2 or 3 carbon atoms. According to certain embodiments R is an alkyl group having no more than 12 or 10 or 8 or 6 or 5 carbon atoms. According to certain embodiments R is an aryl group of 6 to 12 carbon atoms. According to certain embodiments R' has no more than 6 carbon atoms. Examples of suitable monomers include butyl acrylate, ethyl hexyl acrylate, ethyl acrylate, methyl methacrylate, butyl methacrylate, cyclohexyl (meth)acrylate, cyclopentyl methacrylate, tetrahydrofurfyl methacrylate, and benzyl (meth)acrylate. Combinations of two or more such monoethylenically unsaturated ester monomer may be used. For example, a combination of methyl methacrylate and butyl methacrylate can be used. For example, the amount of methyl methacrylate can be at least 20, 30, 40, 50, 60, 70 or 80 weight percent of the reactants and can be for example less than 99.8, 99, 98, 97, 96, 95, 90, 85 weight percent of the reactants. A second monoethylenically unsaturated ester monomer (e.g. butyl acrylate) can be 0 or greater than 0, 1, 2, 3, 4, 5 weight percent of the reactants and less than 60, 50, 40, 30, 20, or 10 of the reactants. In certain embodiments, additional monoethylenically unsaturated ester monomers may be used. The combination of the second and additional monoethylenically unsaturated monomer(s) taken together in such embodiments is greater than 0, 1, 2, 3, 4, 5 weight percent of the reactants and less than 60, 50, 40, 30, 20, or 10 of the reactants.

According to certain embodiments one or more additional monounsaturated addition-polymerizable (e.g. monoethylenically unsaturated) monomers may be included. For example, styrene or acrylonitrile could be added. The amount of such additional is preferable less than 10 or 5 weight percent based on weight of the reactants.

The reactants further comprise a chain transfer agent (CTA). The chain transfer agent may be any compound known or found to be useful as a chain transfer agent in polymerization of acrylate or methacrylate monomers. For example, thiol chain transfer agents can be used. Examples of such thiol CTAs include monofunctional and polyfunctional thiols. Monofunctional thiols include, but are not limited to, propyl mercaptan, butyl mercaptan, hexyl mercaptan, octyl mercaptan, dodecyl mercaptan, thioglycollic acid, mercaptopropionic acid, alkyl thioglycollates e.g.

2-ethyl hexyl thioglycollate or octylthioglycollate, mercaptoethanol, mercaptoundecanoic acid, thiolactic acid, thiobutyric acid. Polyfunctional thiols include trifunctional compounds such as trimethylol propane tris(3-mercaptopropionate), tetrafunctional compounds such as pentaerythritol tetra(3-mercaptopropionate), pentaerythritol tetrathioglycollate, pentaerythritol tetrathiolactate, pentaerythritol tetrathiobutyrate; hexafunctional compounds such as dipentaerythritol hexa(3-mercaptopropionate), dipentaerythritol hexathioglycollate; octafunctional thiols such as tripentaerythritol octa(3-mercaptopropionate), tripentaerythritol octathioglycollate. The use of polyfunctional thiols is a useful way to increase the degree of branching in the polymer. Optionally, the chain transfer agent may comprise a mixture of more than one type of compound. According to one embodiment, the CTA is selected from butyl 3-mercaptopropionate (BMP)

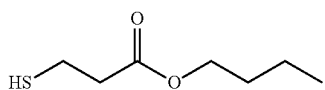

and pentaerythritol tetrakis(3-mercaptopropionate) (PETMP)

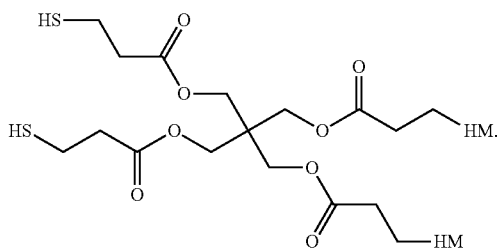

When the CTA is PETMP, about one fourth the molar amount of CTA can be used.

Alternative chain transfer agents may be any species known to reduce molecular weight in the conventional free-radical polymerization of vinyl monomers. Examples include sulphides, disulphides, halogen-containing species. Also, catalytic chain transfer agents such as cobalt complexes, e.g. cobalt (II) chelates such as cobalt porphyrin compounds are useful chain transfer agents for the invention. Suitable cobalt chelates are known in the art and are described in WO 98/04603. A particularly suitable compound is bis(borondifluorodimethylglyoximate) cobaltate (II) also known as CoBF. Catalytic chain transfer agents may be used in relatively low concentrations compared to conventional thiol chain transfer agents, e.g. <0.5% preferably <0.1% by weight (on monofunctional monomer), since they are generally highly effective at low concentrations. Catalytic chain transfer compounds based on cobalt complexes may be very effectively used at concentrations of less than 0.05% (500 ppm) w, e.g. 0.0001-0.01% w (1-100 ppmw) based on monofunctional monomer in the polymerization process of the present invention to give soluble branched polymers.

The amount of chain transfer agent is at least 0.1 or 0.5 or 1 weight percent based on total weight of the reactants. According to some embodiments the amount of chain transfer agent is no more than 10 or 8 or 6 or 5 weight percent based on total weight of the reactants.

The reactants further comprise a cross-linker. Inclusion of the cross-linker provides the branching. However, the amount of cross-linker must be controlled so that the polymer does not cross-link. Preferably, the weight percent of crosslinker is less than or equal to the weight percent of chain transfer agent. Preferably, the weight ratio of chain transfer agent to cross linker is in the range of 1:1 or 1.5:1 to 10:1 based on the weight of chain transfer agent to weight of cross linker. Alternatively, the mole percent of crosslinker is less than the effective mole percent of chain transfer agent. Preferably, the mole ratio of chain transfer agent to cross linker is at least 1.2:1 or 1.4:1 or 1.5:1 or 1.7:1 or 2:1 or 4:1 based on the effective amount of chain transfer agent in moles to the amount of cross linker in moles. As used herein, "the effective amount of chain transfer agent in moles" is based on the number of functional groups on the chain transfer agent. For example, PETMP has four times the number of functional groups as BMP. Therefore, a molar amount of PETMP would have four times the effective amount of a similar molar amount of BMP, i.e., the effective amount of PETMP is four times the actual amount. Similarly, the term "effective mole percent" is also based on the number of functional groups in the chain transfer agent. According to an embodiment the mole ratio of chain transfer agent to cross linker is less than 20:1 or 15:1 or 10:1 based on the effective amount of chain transfer agent in moles to the amount of cross linker in moles.

The cross linker may be any polyfunctional unsaturated monomer—i.e. any monomer having two or more unsaturated groups available for addition polymerization. Examples of suitable bifunctional monomers include: ethylene glycol di(meth)acrylate, hexanediol di(meth)acrylate, tripropylene glycol di(meth)acrylate, butanediol di(meth)acrylate, neopentyl glycol di(meth)acrylate, diethylene glycol di(meth)acrylate, triethylene glycol di(meth)acrylate, dipropylene glycol di(meth)acrylate, allyl (meth)acrylate, divinyl benzene and derivatives thereof. Trifunctional examples include: tripropylene glycol tri(meth)acrylate, trimethylol propane tri(meth)acrylate, pentaerythritol tri (meth)acrylate. Tetrafunctional monomers such as pentaerythritol tetra(meth)acrylate and hexafunctional monomers, e.g. dipentaerythritol hexa(meth)acrylate may also be used. Optionally, the polyfunctional monomer may comprise a mixture of more than one polyfunctional compound. According to one embodiment the crosslinker is

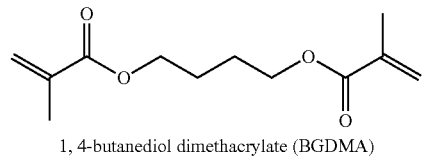 [SMILES: C=C(C)C(=O)OCCCCOC(=O)C(=C)C]

1, 4-butanediol dimethacrylate (BGDMA)

The amount of crosslinker according to some embodiments is at least 0.1 or 0.5 or 1 weight percent based on total weight of the reactants. According to some embodiments the amount of cross linker is no more than 10 or 8 or 6 or 5 weight percent based on total weight of the reactants.

According to certain embodiments the cross linker is BGDMA and the chain train agent is BMP. According to an embodiment the acrylate monomer (e.g. methyl methacrylate) is present in amounts of from 90 to 99 weight percent, the amount of BGDMA is in the range of 1 or 2 to 4 or 3 weight percent and the amount of BMP is in the range of 1 or 2 or 3 to 7 or 6 weight percent based on total weight of acrylate monomer, BGDMA and BMP.

The branched polymer can be made using any free-radical polymerization method, e.g. solution, suspension, emulsion and bulk polymerization methods may all be used. For example, conventional emulsion polymerization may be used.

A surfactant or emulsifier may be used. Examples of emulsifiers include non-ionic, anionic and cationic emulsifiers.

Suitable nonionic emulsifiers are araliphatic or aliphatic nonionic emulsifiers, examples being ethoxylated mono-, di-, and trialkylphenols (degree of ethoxylation: 3 to 50, alkyl radical: $C_4$-$C_{10}$), ethoxylates of long-chain alcohols (degree of ethoxylation: 3 to 100, alkyl radical: $C_8$-$C_{36}$), and also polyethylene oxide/polypropylene oxide homopolymers and copolymers. These may comprise the alkylene oxide units copolymerized in random distribution or in the form of blocks. Highly suitable are, for example, ethylene oxide/propylene oxide block copolymers. Preference is given to using ethoxylates of long-chain alkanols (alkyl radical $C_1$-$C_{30}$, average degree of ethoxylation 5 to 100) and, among these, particular preference to those having a linear $C_{12}$-$C_{20}$ alkyl radical and an average degree of ethoxylation of 10 to 50, and also ethoxylated monoalkylphenols.

Suitable anionic emulsifiers are, for example, alkali metal and ammonium salts of alkyl sulfates (alkyl radical: $C_8$-$C_{22}$), of sulfuric monoesters with ethoxylated alkanols (degree of ethoxylation: 2 to 50, alkyl radical: $C_{12}$-$C_{18}$) and with ethoxylated alkylphenols (degree of ethoxylation: 3 to 50, alkyl radical: $C_4$-$C_9$), of alkylsulfonic acids (alkyl radical: $C_{12}$-$C_{18}$) and of alkylarylsulfonic acids (alkyl radical: $C_9$-$C_{18}$). Further suitable emulsifiers are found in Houben-Weyl, Methoden der organischen Chemie, volume XIV/1, Makromolekulare Stoffe, Georg-Thieme-Verlag, Stuttgart, 1961, pp. 192-208. Also suitable as anionic emulsifiers are bis(phenylsulfonic acid) ethers and their alkali metal or ammonium salts which carry a $C_4$-$C_{24}$ alkyl group on one or both aromatic rings. These compounds are common knowledge, from U.S. Pat. No. 4,269,749, for example, and are available commercially, in the form for example of Dowfax™ 2A1 (Dow Chemical Company).

Suitable cationic emulsifiers are preferably quaternary ammonium halides, e.g., trimethylcetylammonium chloride, methyltrioctylammonium chloride, benzyltriethylammonium chloride or quaternary compounds of N—$C_6$-$C_2$O-alkylpyridines, -morpholines or -imidazoles, e.g., N-laurylpyridinium chloride.

Other suitable surfactants or emulsifiers include phosphate surfactants and emulsifiers, such as the SOPROPHOR® phosphate surfactants available from Solvay and the RHODAFAC phosphate emulsifiers (e.g., RHODAFAC RS 610) available from Solvay.

The amount of emulsifier (or surfactant) can be at least 0.01 or 0.1 weight percent to 10 or 5 weight percent, based on the amount of monomers to be polymerized.

Initiators may be used. Examples of initiators include may be initiated by any suitable method of generating free-radicals such as by thermally induced decomposition of a thermal initiator such as an azo compound, peroxide or peroxyester. Therefore the polymerisation mixture also preferably contains a polymerisation initiator which may be any of those known and conventionally used in free-radical polymerisation reactions. Examples of azo initiators include azobis(isobutyronitrile) (AIBN), azobis(2-methylbutyronitrile), azobis(2,4-dimethylvaleronitrile), azobis(4-cyanovaleric acid). Examples of peroxide and peroxy initiators include hydrogen peroxide, sodium peroxide, potassium peroxide, t-butyl hydroperoxide, cumene hydroperoxide, dilauroyl peroxide, tert-butyl peroxyneodecanoate, dibenzoyl peroxide, cumyl peroxide, tert-butyl peroxy-2-ethyl hexanoate, tert-butyl peroxy diethyl acetate and tert-butyl peroxy benzoate. Examples of additional initiators include ammonium and/or alkali metal persulfates, sodium perborate, perphosphoric acid and salts thereof, potassium permanganate, and ammonium or alkali metal salts of peroxydisulfuric acid, examples being alkali metal or ammonium peroxydisulfates, diacetyl peroxide, dibenzoyl peroxide, succinyl peroxide, di-tert-butyl peroxide, tert-butyl perbenzoate, tert-butyl perpivalate, tort-butyl peroxy-2-ethylhexanoate, tert-butyl permaleinate, cumene hydroperoxide, diisopropyl peroxydicarbamate, bis(o-toluoyl) peroxide, didecanoyl peroxide, dioctanoyl peroxide, dilauroyl peroxide, tert-butyl perisobutyrate, tert-butyl peracetate, di-tert-amyl peroxide, tert-butyl hydroperoxide, azobisisobutyronitrile, 2,2'-azobis(2-amidino-propane)dihydrochloride or 2,2'-azobis(2-methylbutyronitrile). Also suitable are mixtures of these initiators. As initiators it is also possible to use reduction/oxidation (i.e., redox) initiator systems. The redox initiator systems are composed of at least one, usually inorganic, reducing agent and one organic or inorganic oxidizing agent. The oxidizing component comprises, for example, the emulsion polymerization initiators already specified above. The reducing component comprises, for example, alkali metal salts of sulfurous acid, such as sodium sulfite, sodium hydrogen sulfite, alkali metal salts of disulfurous acid such as sodium disulfite, bisulfite addition compounds of aliphatic aldehydes and ketones, such as acetone bisulfite or reducing agents such as hydroxymethanesulfinic acid and salts thereof, or ascorbic acid. The redox initiator systems can be used along with soluble metal compounds whose metallic component is able to occur in a plurality of valence states. Typical redox initiator systems are, for example, ascorbic acid/iron(II)sulfate/sodium peroxodisulfate, tert-butyl hydroperoxide/sodium disulfite, tert-butyl hydroperoxide/Na hydroxymethanesulfinate. The individual components, the reducing component for example, may also be mixtures, an example being a mixture of the sodium salt of hydroxymethanesulfinic acid and sodium disulfite.

The amount of initiator is generally at least 0.01 or 0.05 or 0.01 weight percent to 10 or 5 or 3 weight percent based on all of the monomers to be polymerized.

The branched polymers are not cross-linked. For example, this can be demonstrated by evaluating the solubility of the polymers in a solvent such as tetrahydrofuran. A cross-linked polymer will not be soluble.

The branched polymers according to certain embodiments can be characterized by a polymer branching ratio, g', of less than 1, 0.95, 0.9, 0.8. According to some embodiments g' is at least 0.5 or 0.6 or 0.7. The polymer branching ratio (g') is calculated by comparing measured the intrinsic viscosity of the branched polymer ($[\eta]_{branched}$) at each elution volume increment to the intrinsic viscosity of the linear polymer ($[\eta]_{linear}$) with the same molecular weight (M) (Eq. 1) in gel permeation chromatography (GPC) analysis. For a linear polymer, g' value equals to 1 and, for a branched polymer, g' is smaller than 1.

$$g' = \left(\frac{[\eta]_{branched}}{[\eta]_{linear}}\right)_M \quad \text{(Eq. 1)}$$

Molecular Weight Analysis: The polymer absolute molecular weights ($M_w$, $M_n$), PMMA-relative molecular weights ($M_{w\_PMMA}$, $M_{n\_PMMA}$), intrinsic viscosity ($[\eta]_w$, $[\eta]_n$), and branching ratio (g') can be measured by gel permeation chromatography with online multi-angle light scattering (MALS) detector, viscometer (VS), and differential refractive index (dRI) detector. For example, the GPC instrument setup can include an Agilent 1200 series HPLC system (degasser, pump, autosampler and column oven), a Wyatt HELEOS II MALS detector, a Wyatt ViscoStar II viscometer, and a Wyatt T-rEX dRI detector. The polymer separation can be carried out on a column set e.g. having two PLgel mixed B LS columns (10 μm particle size, 7.5×300 mm length) using tetrahydrofuran (THF) as the mobile phase at a flow rate of 1 mL/min. Column oven temperature is set at 30° C. A set of 10 points PMMA standards (Agilent EasiCal PM-1) is used to calibrate the GPC columns and provide the PMMA-relative molecular weight. The absolute molecular weights are obtained from the MALS detection using Zimm formalism and the intrinsic viscosity data are obtained from the viscometer. High molecular weight fractions data (PMMA-relative molecular weight larger than 6500 Da) are used to calculate average g' values. For consistency of g' calculation, a linear PMMA model from Mark-Houwink equation (Eq. 2, where K=0.0383 mL/g and α=0.581 for non-BA containing samples in Table 2 and K=0.03044 mL/g and α=0.615 for BA containing polymers in Table 2) is used to obtain the ($[\eta]_{linear}$) in Eq. 1 using the M data from MALS detection.

$$[\eta]=KM^\alpha \quad (Eq. 2)$$

The weight average molecular weight, $M_w$, as measured by GPC of the branched polymer is preferably in the range of at least 8000 or 10,000 or 15,000 or 20,000 g/mol. Preferably, the weight average molecular weight is no more than 100,000 or 80,000 g/mol. The number average molecular weight, $M_n$, of the branched polymer as measured by GPC is preferably at least 3000 or 4000 or 5000 g/mol. Preferably, the number average molecular weight is no more than 50,000 or 40,000 or 30,000, or 20,000 g/mol.

Preferably, the branched structure is a dendritic structure.

Preferably, the amount of branched polymer in the composition is at least 1 or 3 or 5 or 10 weight percent. The composition may be in a concentrated form and then mixed with a polycarbonate or engineering resin polymer to get to the desired amount of branched polymer in the composition that is being processed (e.g. extruded, injection molded). In concentrated form, the amount of branched polymer may comprise a significant portion of the composition, for example up to 60 or 50 or 40 weight percent. For use in processing, to get the benefits of higher melt flow index (lower viscosity), the composition may according to certain embodiments comprise the branched polymer in amounts up to 30 or 25 or 20 weight percent. The branched polymer is soluble (miscible) in the polycarbonate or engineering resin in the amounts used.

The composition may further comprise additional additives as are desired for the final product. Examples of such additives include UV light stabilizers and antioxidants. According to certain embodiments that additives are selected such that the composition remains transparent. Examples of UV light stabilizers include benzophenones, benzotriazoles, trianzines, benzoxazinones, hindered amine light stabilizer (HALS) and hindered benzoates. Commercially available UV and light stabilizers are exemplified by Cyasorb Light Absorbers, and Light Stabilizers, and Cyasorb Cynergy Solutions from Solvay, TINUVIN FROM BASF, LowLite from Chemtura, OnCap from PolyOne, and Light Stabilizer 210 from E. I. du Pont de Nemours and Company of Delaware, U.S.A. Examples of antioxidants include phenolic antioxidants, and combinations of phenolic antioxidants with phosphites, thioethers or organic sulfides. Phenolic antioxidants include fully sterically hindered phenols and partially hindered phenols; and sterically hindered amines such as tetramethyl-piperidine derivatives. Suitable phenolic antioxidants include vitamin E and IRGANOX™ 1010 from BASF. IRGANOX™ 1010 comprises pentaerythritol tetrakis(3-(3,5-di-t-butyl-4-hydroxyphenyl)propionate).

In certain uses, light transmission for compositions is desired. It has been surprising discovered that the branched polymer additives can be used to form polycarbonate composition with high light transmission or low haziness. According to certain embodiments the composition is non-hazy. Preferably, the non-hazy compositions have a haze as measured by light transmission of less than 5% as measured according to ASTMD1003 using suitable instrument, e.g. BYKHazeGuard Plus. Preferably, the non-hazy compositions have a haze as measured by light transmission of less than 4%, more preferably less than 3%, and even more preferably less than 2%. When a non-hazy composition is desired, the composition preferably does not comprise an impact modifier.

When light transmission is not required, the composition preferably comprises an impact modifier.

The composition may be made by conventional melt compounding process the components. A 26 mm lab co-rotating twin screw extruder with L/D of 27, equipped with 5 mm strand die was used to process the above compositions under the conditions listed below in Table 1. The resulting strands of molten resin were cooled by passing the strands through a water bath. The cooled strands were chopped into small pellets, and the pellets were later injection molded into test bars for mechanical property testing.

TABLE 1

| Barrel Zone Temperatures (° C.) | | | | | | | | | Feeder |
|---|---|---|---|---|---|---|---|---|---|
| 1 | 2 | 3 | 4 | 5 | 6 | 7 | DIE | RPM | lb/hr |
| 130 | 260 | 280 | 290 | 290 | 290 | 290 | 295 | 100 | 15 |

The composition is useful in extruding, and injection molding applications due to the favorable melt flow index.

Examples

Synthesis of Branched Polymer Additive #1

The emulsion polymerization is carried out in a 5 liter 4-necked round bottom flask equipped with a mechanical stirrer, heating mantel, thermometer, temperature controller and N2 inlet. To the reactor is charged 1063 parts of deionized water, 6.01 parts of A18 alkyl sulfate surfactant (42% in water) and 0.091 parts of Fe-EDTA complex (as Sequestrene). The contents of the reactor were heated to 75° C. with an N2 sweep. A monomer emulsion is prepared in a separate container with 238.5 parts of deionized water, 24.04 parts of A18 alkyl sulfate surfactant (42% in water), 50 parts of butyl acrylate (BA), 875 parts of methyl methacrylate (MMA), 50 parts of butyl 3-mercaptopropioante (BMP) and 25 parts of 1,4 butanediol dimethacrylate (BGDMA). Mechanical agitation is applied to effect emulsification. The redox initiator system consists of 2 separate solutions. The first is a 2% (by weight) solution of t-butyl hydroperoxide (t-BHP) in water (oxidant) and the second is a 2% (by weight) solution of sodium formaldehyde sulfoxyate (SFS) in water (reductant), both 80 parts total. 94.69 parts of the monomer emulsion were added to the reactor vessel and after 1 minute (time zero) simultaneous feeds of the t-BHP and SFS solutions were started at 0.89 parts/minute (both 90 minute feed times). The reactor temperature is maintained at 75° C. for the entire polymerization process. After 15 minutes the rest of the monomer emulsion is fed at 19.46 parts/minute (60 minute feed time). At the end of the monomer feed (total reaction time 75 minutes from time zero) the t-BHP and SFS continued for another 15 minutes (total reaction time 90 minutes from time zero). The reaction is then cooled to 40° C. and filtered through cheesecloth. The emulsion particle size of a polymer made by this method was measured to be 124 nm (by light scattering), the solids content was 39.9% (by gravimetry) and the residual BA and MMA monomers were 27 and 98 ppm respectively (by headspace gas chromatography). Some of the latex is then freeze dried to a powder using dry ice and then a vacuum oven.

Branched Polymer Additives #2 to 6

Branched polymer additives of varying composition were prepared using the process described above for Branched Polymer Additive #1. Branched Polymer Additives #2 to 6 varied the amount of BA, the amount and composition of CTA, and amount of crosslinker in the composition, as shown below in Table 2.

TABLE 2

| Branched Polymer Additive | Compositions | | |
|---|---|---|---|
| | BA (wt %) | CTA (wt %) | Crosslinker (wt %) |
| 1 | 5 | 5 BMP | 2.5 |
| 2 | 5 | 5 BMP | 1.5 |
| 3 | 0 | 5 BMP | 2.5 |
| 4 | 0 | 5 BMP | 1.5 |
| 5 | 5 | 5 MMP | 1.5 |
| 6 | 0 | 5 MMP | 1.5 |
| 7 | 0 | 5 BMP | 2.5 |
| 8 | 0 | 2.5 BMP | 1.5 |

Polycarbonate Composition with Branched Polymer Additive

Compositions comprising a polycarbonate resin (LEXAN™ 141 from Sabic) and a branched polymer additive at three different loading levels (5 wt %, 10%, and 15 wt % of the branched polymer additive) as described above were prepared using a 26 mm lab co-rotating twin screw extruder with L/D of 27, equipped with 5 mm strand die was used to process the above compositions under the conditions listed below. The resulting strands of molten resin were cooled by passing the strands through a water bath. The cooled strands were chopped into small pellets, and the compositions were tested to determine their melt flow index (MFI) according to ASTM D1238 as described above. The results are shown below in Table 3.

TABLE 3

| Branched Polymer Additive | MFI (300° C., 1.2 kg weight) (g/10 min) | | |
|---|---|---|---|
| | 5 wt % Loading | 10 wt % Loading | 15 wt % Loading |
| 1 | 42.1 | 73.2 | 170.6 |
| 2 | 21.0 | 48.1 | 85.1 |
| 3 | 34.3 | 40.3 | 40.1 |

TABLE 3-continued

| Branched Polymer Additive | MFI (300° C., 1.2 kg weight) (g/10 min) | | |
|---|---|---|---|
| | 5 wt % Loading | 10 wt % Loading | 15 wt % Loading |
| 4 | 26.5 | 32.7 | 52.4 |
| 5 | 34.1 | 54.9 | 125.8 |
| 6 | 25.4 | 34.8 | 47.2 |

Polycarbonate Compositions with Branched Polymer Additive and Impact Modifier

Polymer compositions comprising a polycarbonate resin (LEXAN™ 141 from Sabic), Branched Polymer Additive #1, and a MBS impact modifier (PARALOID™ EXL2690 from Dow Chemical Company] were compounded using a 26 mm lab co-rotating twin screw extruder with L/D of 27, equipped with 5 mm strand die under the conditions shown in Table 1. The resulting strands of molten resin were cooled by passing the strands through a water bath. The cooled strands were chopped into small pellets, and the pellets were later on injection molded into plaques (3.0×6.0×⅛ inch), the plaques were placed in a QUV test equipment (manufactured by The Q Panel Company) for accelerated weathering testing (QUV) following ASTM G151, ASTM G154 test standards, exposure conditions are shown in Table 4. The plaque color properties were measured after every 200 hrs QUV exposure

TABLE 4

| UVA lamp | 340 nm |
|---|---|
| Light cycle: | 60° C., 8 hours |
| Condensation cycle: | 50° C., 8 hours |

As shown in Table 5, the impact resistance was tested after 0 hours, 500 hours, and 1000 hours of weathering. Compositions were prepared comprising a polycarbonate resin (LEXAN™ 141 from Sabic), Branched Polymer Additive #1, and a MBS impact modifier (PARALOID™ EXL2690 from Dow Chemical Company]. The compositions were prepared by using a 26 mm lab co-rotating twin screw extruder with L/D of 27, equipped with 5 mm strand die was used to process the above compositions under the conditions shown in Table 1. The resulting strands of molten resin were cooled by passing the strands through a water bath. The cooled strands can be chopped into small pellets, and the pellets were later on injection molded into test bars for mechanical property testing. The results are shown below in Tables 5 and 6.

TABLE 5

| Composition | Type of Break | Comparative Example 1 LEXAN™ 141 w/5 wt % MBS | Example 1 LEXAN™ 141 w/5 wt % MBS & 0.5 wt % Branched Polymer Additive #1 | Example 2 LEXAN™ 141 w/5 wt % MBS & 1.0% Branched Polymer Additive #1 |
|---|---|---|---|---|
| Izod @ 23 C. 0 hour ft-lbs/in (Std. Dev.) | complete breaks partial breaks | 14.1 | 13.6 | 13.7 |

TABLE 5-continued

| Composition | Type of Break | Comparative Example 1 LEXAN™ 141 w/5 wt % MBS | Example 1 LEXAN™ 141 w/5 wt % MBS & 0.5 wt % Branched Polymer Additive #1 | Example 2 LEXAN™ 141 w/5 wt % MBS & 1.0% Branched Polymer Additive #1 |
|---|---|---|---|---|
| | (Std. Dev.) | 0.9 | 0.1 | 0.2 |
| | # Break type | 5 partial | 5 partial | 5 partial |
| Izod @ 23 C. 500 hour ft-lbs/in | complete breaks | | | 4.9 |
| | (Std. Dev.) | | | 0 |
| | partial breaks | 13.4 | 13.1 | 12.1 |
| | (Std. Dev.) | 0.1 | 0.4 | 2.3 |
| | # Break type | 5 partial | 5 partial | 4 partial/ 1 complete |
| Izod @ 23 C. 1000 hour ft-lbs/in | complete breaks | 0.97 | 0.74 | |
| | (Std. Dev.) | 0.1 | 0.1 | |
| | partial breaks | | | 12.8 |
| | (Std. Dev.) | | | 0.3 |
| | # Break type | 5 complete | 5 complete | 5 partial |

Weatherability Tests

Compositions were prepared and tested for weatherability. The compositions were prepared as described above using LEXAN™ 141 polycarbonate resin as the base resin and an MBS impact modifier (PARALOID™ EXL2690). The formulation for each composition is shown below in Table 7. The weatherability was tested using a QUV Exposure Test as described above. The results of the weatherability testing is shown in FIG. 1 as the percentage of ductile break.

TABLE 7

| Example | Branched Polymer Additive (wt %) | Impact Modifier (wt %) |
|---|---|---|
| Comparative Example 3 | 0% | 5% MBS |
| Example 21 | 0.5% Additive #1 | 5% MBS |
| Example 22 | 1.0% Additive #1 | 5% MBS |
| Example 23 | 0.5% Additive #7 | 5% MBS |
| Example 24 | 1.0% Additive #7 | 5% MBS |
| Example 25 | 1.0% Additive #8 | 5% MBS |

TABLE 6

| Example | Branched Polymer Additive (wt %) | Yield Strength (psi) | Break Strength (psi) | Modulus (psi) | Break Strain (%) | Charpy (KJ/m2) | Charpy (unnotched) (KJ/m2) | MFI (300 C., 1.2 kg) |
|---|---|---|---|---|---|---|---|---|
| Comparative Example 2 | 0% (Neat LEXAN™ 141) | 8827.5 | 9162.22 | 247827 | 89.1 | 84.48 | NB | 11.231 |
| Example 3 | 5% Additive #1 | 9662.28 | 8536.25 | 259632 | 69.79 | 8.9 | NB | 42.06 |
| Example 4 | 10% Additive #1 | 10157.42 | 7909.39 | 266070 | 46.56 | 5.7 | NB | 73.168 |
| Example 5 | 15% Additive #1 | 6068.57 | 5779.05 | 272750 | 2.84 | 4 | 80% NB, 45.5 | 170.59 |
| Example 6 | 5% Additive #2 | 9630.93 | 9258.19 | 256781 | 87.35 | 9.7 | NB | 21.031 |
| Example 7 | 10% Additive #2 | 10124.25 | 8792.1 | 267218 | 70.1 | 6.9 | NB | 48.126 |
| Example 8 | 15% Additive #2 | 10403.44 | 7847.64 | 273620 | 39.18 | 4.35 | NB | 85.084 |
| Example 9 | 5% Additive #3 | 9671.06 | 8764.76 | 259662 | 73.36 | 9.7 | NB | 34.265 |
| Example 10 | 10% Additive #3 | 10178.85 | 8138.13 | 266671 | 51.97 | 5.9 | NB | 40.34 |
| Example 11 | 15% Additive #3 | 10181.52 | 8555.28 | 265357 | 62.86 | 6.85 | NB | 40.136 |
| Example 12 | 5% Additive #4 | 9558.79 | 9713.71 | 254143 | 98.61 | 11.65 | NB | 26.459 |
| Example 13 | 10% Additive #4 | 10224.64 | 8684.87 | 265930 | 65.31 | 6.2 | NB | 32.698 |
| Example 14 | 15% Additive #4 | 10579.48 | 8265.88 | 273257 | 49.18 | 4.35 | NB | 52.44 |
| Example 15 | 5% Additive #5 | 9666.39 | 8768.13 | 257522 | 72.03 | 10.05 | NB | 34.148 |
| Example 16 | 10% Additive #5 | 10227.37 | 8136.36 | 271842 | 49.32 | 6.35 | NB | 54.872 |
| Example 17 | 15% Additive #5 | 8125.48 | 7720.73 | 277330 | 10.42 | 3.6 | NB | 125.825 |
| Example 18 | 5% Additive #6 | 9491.74 | 9042.93 | 254077 | 79.51 | 12 | NB | 25.392 |
| Example 19 | 10% Additive #6 | 10175.35 | 8878.81 | 265937 | 68.58 | 7.15 | NB | 34.865 |
| Example 20 | 15% Additive #6 | 10574.89 | 8311.79 | 273035 | 47.67 | 4.35 | NB | 47.182 |

Figure 2:
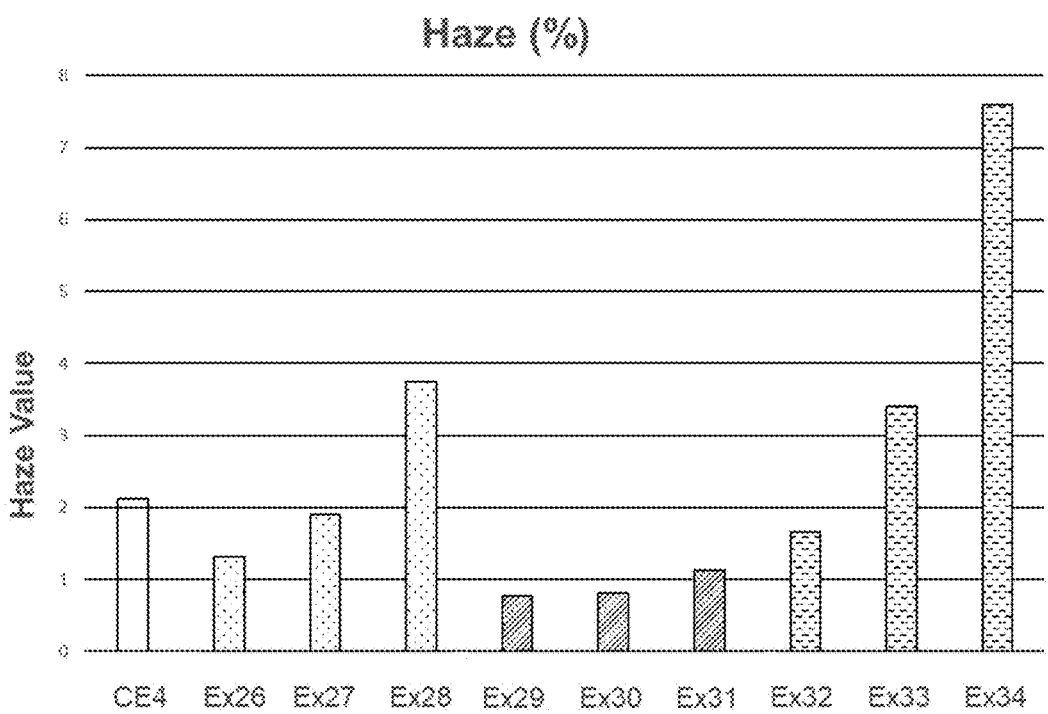
FIG. 2 shows the haze values for compositions according to embodiments of the present invention.

Light Transmission of Polycarbonate Compositions with Branched Polymer Additives Polycarbonate compositions comprising the branched polymer additives according to the present invention were prepared to test light transmission. The compositions were prepared as described above and had formulations and properties as shown in Table 8. Haze was measured by light transmission according to ASTMD1003 using BYKHaze-Guard Plus instrument. The results of the haze testing is shown in FIG. 2.

TABLE 8

| Example | Branched Polymer Additive | Amount of Branched Polymer Additive (wt %) | Avg. Ductile Break Energy (ft-lb/in) | Avg. Brittle Break Energy (ft-lb/in) | Ductility (%) | Average Total Break Energy |
|---|---|---|---|---|---|---|
| Comp. Ex. 4 | None-Neat LEXAN ™ 141 | 0% | 16.55 | | 100 | 16.55 |
| Example 26 | Additive #1 | 1% | 15.68 | | 100 | 15.68 |
| Example 27 | Additive #1 | 2% | 14.70 | | 100 | 14.70 |
| Example 28 | Additive #1 | 3% | | 2.15 | 0 | 2.15 |
| Example 29 | Additive #7 | 1% | 16.15 | | 100 | 16.15 |
| Example 30 | Additive #7 | 2% | 15.51 | | 100 | 15.51 |
| Example 31 | Additive #7 | 3% | 15.07 | 2.37 | 90 | 13.80 |
| Example 32 | Additive #8 | 1% | 14.73 | | 100 | 14.73 |
| Example 33 | Additive #8 | 2% | 13.72 | | 100 | 13.72 |
| Example 34 | Additive #8 | 3% | 11.64 | 3.08 | 10 | 3.93 |

What is claimed is:

1. A composition comprising:
   a resin selected from a polycarbonate and an engineering resin, and blends thereof, wherein the resin does not comprise a multi-stage acrylic resin, and
   a branched polymer which is a reaction product of reactants comprising one or more monoethylenically unsaturated ester monomers, a chain transfer agent comprising butyl 3-mercaptopropioante in an amount of 2 to weight percent, and a crosslinker comprising 1,4 butanediol dimethacrylate in an amount of 0.5 to 4 weight percent, wherein weight percent is based on total amount of reactants, provided the amount of crosslinker in moles is less than the effective amount of chain transfer agent in moles.

2. The composition of claim 1 wherein the branched polymer is not cross-linked.

3. The composition of claim 1 wherein the one or more monoethylenically unsaturated ester monomers has the structure R'—C(O)O—R where R is a hydrocarbyl group of 1 to 12 carbon atoms and R' is a monoethylenically unsaturated aliphatic group having at least 2 or 3 carbon atoms.

4. The composition of claim 1 wherein the amount of cross-linker is from 1 to 3 weight percent.

5. The composition of claim 1 wherein the amount of chain transfer agent is from 2 to 4 weight percent.

6. The composition of claim 1 wherein the composition has a haze of 5% or less.

7. The composition of claim 1 further comprising an impact modifier.

8. The composition of claim 7 wherein the impact modifier is a methacrylate-butadiene-styrene impact modifier.

9. The composition of claim 7 comprising 1 to 10 weight percent of the impact modifier based on total weight of the composition.

10. The composition of claim 1 comprising 50 to 99 weight percent of the polycarbonate or engineering resin and 1 to 50 weight percent of the branched polymer based on total weight of the composition.

11. The composition of claim 10 comprising 75 to 95 weight percent of the polycarbonate or engineering resin and 5 to 25 weight percent of the branched polymer based on total weight of the composition.

12. The composition of claim 1 wherein the resin is selected from a polycarbonate and poly(methyl methacrylate).

13. An article comprising the composition of claim 1.

* * * * *